US 6,726,111 B2

(12) United States Patent
Weimer et al.

(10) Patent No.: US 6,726,111 B2
(45) Date of Patent: Apr. 27, 2004

(54) METHOD AND APPARATUS FOR CENTRALLY CONTROLLING ENVIRONMENTAL CHARACTERISTICS OF MULTIPLE AIR SYSTEMS

(75) Inventors: John R. Weimer, Stacy, MN (US); Timothy G. Hoyez, Circle Pines, MN (US)

(73) Assignee: Tjernlund Products, Inc., White Bear Lake, MN (US)

( * ) Notice: Subject to any disclaimer, the term of this patent is extended or adjusted under 35 U.S.C. 154(b) by 57 days.

(21) Appl. No.: 09/922,934

(22) Filed: Aug. 6, 2001

(65) Prior Publication Data

US 2002/0014538 A1 Feb. 7, 2002

Related U.S. Application Data

(60) Provisional application No. 60/223,026, filed on Aug. 4, 2000.

(51) Int. Cl.[7] .............................. F24F 7/00; G05D 23/00
(52) U.S. Cl. ........................ 236/51; 236/49.3; 62/175
(58) Field of Search .................... 236/51, 49.3, 11, 236/1 EA; 62/175

(56) References Cited

U.S. PATENT DOCUMENTS

| | | | |
|---|---|---|---|
| 4,822,385 A | 4/1989 | Strege et al. | |
| 4,903,685 A | 2/1990 | Melink | 126/299 |
| 5,139,009 A | 8/1992 | Walsh | |
| 5,148,977 A | 9/1992 | Hibino et al. | |
| 5,224,648 A * | 7/1993 | Simon et al. | 236/51 |
| 5,247,806 A | 9/1993 | Ebisu et al. | |
| 5,390,206 A * | 2/1995 | Rein et al. | 236/51 X |
| 5,410,890 A | 5/1995 | Arima | |
| 5,418,438 A | 5/1995 | Hollenebeck | 318/432 |
| 5,505,057 A | 4/1996 | Sato et al. | |
| 5,557,182 A | 9/1996 | Hollenbeck et al. | 318/432 |
| 5,579,993 A | 12/1996 | Ahmed et al. | |
| 5,642,784 A | 7/1997 | Guay et al. | |
| 5,682,826 A | 11/1997 | Hollenbeck | 110/147 |
| 5,791,155 A | 8/1998 | Tulpule | |
| 5,793,646 A | 8/1998 | Hibberd et al. | |
| 5,806,440 A | 9/1998 | Rowlette et al. | 110/162 |
| 5,988,860 A | 11/1999 | Hefferen et al. | |
| 6,009,939 A | 1/2000 | Nakanishi et al. | |
| 6,059,194 A | 5/2000 | Wintrich et al. | |
| 6,126,080 A | 10/2000 | Wada | |
| 6,142,142 A | 11/2000 | Woodall, III et al. | |
| 6,145,751 A | 11/2000 | Ahmed | |
| 6,152,375 A | 11/2000 | Robison | |

(List continued on next page.)

OTHER PUBLICATIONS

Mechanical Venting of Chimney and Stacks, brochure, Exhausto, 8 pp., Sep. 1997.
Hoyez et al.; Thermostatically controlled Power Draft Motor Cooling System; U.S. patent application No. 09/774,277; filing date: Jan. 30, 2001.

*Primary Examiner*—William Wayner
(74) *Attorney, Agent, or Firm*—Patterson, Thuente, Skaar & Christensen, P.A.

(57) ABSTRACT

The present invention provides a system and single controller for receiving constant and individualized in information from a plurality of air control systems. A single controller is capable of controlling and interacting with at least two separate air control systems to control an environmental characteristic, and in the process, reduces the costs associated with the manufacturing and every day operation of the individual systems. In addition, the controller is capable of intelligently communicating with the input and output devices of the system, and particularly with each individually interfaced appliance, such that the controller can adaptively control the system through the use of stored historical data.

12 Claims, 7 Drawing Sheets

U.S. PATENT DOCUMENTS

| | | |
|---|---|---|
| 6,170,480 B1 | 1/2001 | Melink et al. ............... 126/299 |
| 6,213,404 B1 | 4/2001 | Dushane et al. |
| 6,230,980 B1 | 5/2001 | Hudson |
| 6,241,156 B1 | 6/2001 | Kline et al. |
| 6,250,560 B1 | 6/2001 | Kline et al. |
| 6,264,111 B1 | 7/2001 | Nicolson et al. |
| 6,283,380 B1 | 9/2001 | Nakanishi et al. |
| 6,290,141 B1 | 9/2001 | Park et al. |
| 6,307,343 B1 | 10/2001 | Lee et al. |
| 6,319,114 B1 * | 11/2001 | Nair et al. ............. 236/49.3 X |
| 6,338,437 B1 | 1/2002 | Kline et al. |
| 6,349,883 B1 | 2/2002 | Simmons et al. |
| 6,385,510 B1 | 5/2002 | Hoog et al. |
| 2001/0042792 A1 | 11/2001 | Kline et al. |
| 2002/0029096 A1 | 3/2002 | Takai et al. |

\* cited by examiner

METHOD AND APPARATUS FOR CENTRALLY CONTROLLING ENVIRONMENTAL CHARACTERISTICS OF MULTIPLE AIR SYSTEMS

CLAIM TO PRIORITY

The present application claims priority to U.S. provisional patent application No. 60/223,026 entitled "Constant Pressure Controlled Vent System", and filed Aug. 4, 2000. The contents of this provisional application are hereby incorporated by reference in its entirety.

FIELD OF THE INVENTION

The present invention relates to air control systems. More specifically, the present invention relates to a system capable of maintaining constant environmental characteristics in more than one air control system through the use of a single controller that receives and processes detailed input from each of the air control systems and interfaced appliances.

BACKGROUND OF THE INVENTION

The need for air control systems first became apparent in the $16^{th}$ century with the advent of chimneys in Europe. Despite improvements since then, most chimneys still operate on a natural draft system. A natural draft chimney operates by force of gravity. That is, the hot flue gases in the chimney are lighter than the surrounding ambient air. Being lighter, flue gases are displaced by cooler, heavier air and rise buoyantly through the chimney flue creating a natural draft.

This natural drafting is affected by a host of environmental factors. Ambient air temperature and atmospheric pressure affect the density of the ambient air mass. If the density of the ambient air mass is reduced, the efficiency of the natural drafting is reduced as well. For example, wind can either increase draft by blowing across the intake portion of a naturally drafting system creating a venturi effect, or reduce draft if turbulent. In addition, wind can cause a back draft, a reverse flow through a system. In the case of a chimney, this can cause flue gases to be vented within a building.

Over the years, systems have been developed where appliances are designed to operate in modular or modulated fashion. Boilers, heaters, water heaters, and other appliances operate in groups. Each unit may fire or power up at different times in response to specific demands. As a result of this modular configuration, the demand upon the pressure, temperature, and the like, within the enclosed building can vary greatly depending on the operation of these appliances.

These factors create the potential for insufficient draft and overdraft which may cause undesirable, and even unsafe conditions within the enclosed air system. In addition, failure to control the quality of air within an enclosed environment, or the flues connected to the appliances for exhausting air, may drastically impede the efficiency and general operation of the appliances since an appliance or group of appliances require specific air flow rates for optimal performance.

With regard to draft systems, power venting systems have increased in popularity. The conventional power draft systems fall into two basic classes. The traditional mechanical draft system is a so-called constant volume system in which a fan provides a constant volume gas flow through a flue to carry exhaust gases to the exterior. Likewise, the mechanical draft system could also be set up to provide an intake air flow for bringing air into an enclosed environment or air system. This constant flow of air thorough an air system is inefficient and costly. Three to five thousand cubic feet per minute of air may be expelled by these systems causing loss of heat in the winter and loss of cooled air in the summer. In the case of intake flows, the mechanically drawn air brought into an air system could provide an undesirable pressure within the system. In addition, this inflexible flow of air in or out of the air system can again impede the efficiency and general operation of any appliances.

In recent years, power venting systems have been implemented in HVAC, kitchen, and other systems to deal with the inherent drawbacks of a mechanical draft system. Namely, controller devices have been advanced which connect to intake and outtake fans for controlling air system characteristics in a single system. Generally, these systems are most often utilized in detecting and controlling the pressure characteristic within a vent flue. Two sensors are placed within the venting system to sense pressure changes. These sensors are in communication with one electronic controller for processing data and controlling input and output devices, such as the sensors and fan. Typically, these two switch sensors are used with one sensor defining the low pressure point and the other defining the high pressure point. Each pressure setting is defined by inputted parameters. These two pressure points define a window of acceptable pressure within the venting flue. If the pressure in the flue falls outside this window, the relevant sensor is triggered and provides a closed circuit for sending a signal to power the fan up or down, depending on which sensor is triggered. In such a system, the fan adjusts the pressure by fully powering up or down, or in the alternative, by switching to predetermined limited speeds such as high, medium, low, or some other variation. While an improvement over more traditional mechanical draft systems, this method of adjustment is costly and inefficient, and fails to make the precise system-wide adjustments needed to maintain a truly "continuous" pressure system. While such systems may be referred to as "constant" pressure systems, such a designation is not a true characterization of their operation.

The innate drawback of such an "on-off" air control system is that it is incapable of providing and maintaining a constant pressure within the system. The pressure window may be so large as to permit a great range of pressure deviation before any adjustments are made by the turning on of a fan. Similarly, if the pressure window is made small in an attempt to maintain pressure, the fan is frequently turned on and off to adjust for fluctuations in pressure. On-off switches and non-variable fan motors may continuously jump through pressure levels in an attempt to maintain pressure, but they are incapable of keeping pressure at precise levels, especially when an air system is dynamically effected by the demands of multiple appliances and changing environmental factors such as wind.

Even those systems that have attempted to implement a single sensor to measure and maintain a characteristic such as pressure do so using these "on-off" techniques, and inevitably jump the fan speed to predetermined and limited levels. In addition, conventional systems fail to maximize the efficiency and effectiveness, and reduce the cost, associated with controlling their systems since they implement an independent controller for each system, and fail to arm the controllers they do use with effective appliance interfacing and adaptive technology.

Those conventional systems attempting to monitor and maintain an environmental characteristic, unfortunately, do assign one controller to each air control system. For example, one controller would receive sensor input and provide control over a venting system, and a separate controller would be assigned to a combustion intake system. Consequently, repetitive circuitry and control structures are required for each system, even when numerous air systems (i.e., venting, combustion, and heating) are contained within one building. This presents a significant cost problem, as well as a training and standardization problem. The cost problem is significant at the production level, and at the purchasing level. A purchaser would obviously prefer not to expend monies on a controller for each individual air control system contained within a particular enclosed environment. In addition, the training and standardization problem likely increases over time. As time passes, it is quite possible that vastly different controllers will be purchased and implemented for the different air control systems within one enclosed environment. Each controller will operate differently, varying in operating parameters, inputting methods, and other functions. Training, usage, and maintenance costs will also increase with the employment of an individual controller at each air control system. The standardization benefits and cost savings would be substantial if only one controller was used to monitor and control a plurality of air control systems.

In addition, the conventional wisdom is to collectively deal with appliances within an air control system. Regardless of the individual effect of any one appliance on the system, the appliances are addressed as a group. For instance, if one appliance fires up and causes a significant pressure change in the system, and the controller is unable to control the pressure through an exhaust fan adjustment, an entire block or group of appliances will be shut down until the problem can be addressed. In addition, this restrictive view of appliance groups does not permit the system to retain historical data representative of each individual appliance tied into the overall air control system. If historical data could be stored, modified, and utilized by the controller for each appliance, efficiency and system performance could be significantly increased.

For example, in the previously given scenario, it was merely the firing up of the last appliance that caused the system to exceed the bounds of the acceptable pressure parameters. Ideally, an intelligent air control system, and specifically the controller, would be operably interfaced with all of the appliances individually within the system, such that the last fired appliance would be the only appliance shut down to keep the system within the acceptable parameters.

Another application of an intelligent controller centers around the ability to bypass time consuming and costly operational steps. For the sake of illustration, it would be beneficial for a controller to keep track of what system adjustments were needed under specific pressure requirements, taking into account the demands of the appliances, wind, and other factors. For example, instead of systematically adjusting fan speed to obtain a desired pressure based on a system demand, it would be more efficient to immediately adjust the speed of the fan to a specific acceptable level based on known past historical data for an identical or similar demand. This historical data could be stored and evaluated for a nearly endless array of appliance combinations, pressure requirements, and environmental factors. Such a controller would be able to learn from past operations and adapt in a manner permitting more efficient operation any time a specific situation arises in the future. Along these same lines, it would be beneficial if this valuable data regarding system operations, appliance functioning, system demand, and the like could be made available through electronic communication to other independent systems such as those used for building and facility management.

As a result of each of these existing deficiencies, there is a need for an air control system which is capable of maintaining an environmental characteristic, such as pressure, at a constant rate within an enclosed environment, even when the enclosed environment is periodically subject to system-altering internal factors, such as the powering up of appliances, and external factors, such as wind gusts entering the system. Additionally, there is a need for one centralized system controller equipped to monitor and control two or more systems in their corresponding enclosed environments, doing so in a manner that reduces costs and increases efficiency and standardization. This system controller should be able to individually interface with each appliance within the air control system such that system-wide needs can be more clearly understood, enabling the controller to make more accurately focused adjustments to meet those needs. Moreover, there is a need for this controller to be equipped with adaptive technology, enabling it to again increase efficiency, and to better enable it to make informed decisions to control and maintain an environmental characteristic parameter within each attached system.

SUMMARY OF THE INVENTION

The present invention provides an air control system which in large part solves the problems referred to above, by providing a system and single controller for receiving constant and individualized information from a plurality of air control systems. The single controller is capable of controlling and interacting with at least two separate air control systems to control an environmental characteristic, and in the process, reduces the costs associated with the manufacturing and every day operation of the individual systems. In addition, the controller is capable of intelligently communicating with the input and output devices of the system, and particularly with each individually interfaced appliance, such that the controller can adaptively control the system through the use of stored historical data.

The single controller can be attached to a plurality of air control systems controlling environmental characteristics within their own enclosed environments, with each system providing input to the controller, the controller processing the input and providing output to each system individually. In addition to the one shared controller, each system can include a separate variable speed fan, attached appliances for which the system is centered around, and an enclosed environment such as an exhaust duct for pulling air into, or pushing air out of, the system. The individual air control systems can vary in function from pressure controlled venting and combustion systems to temperature controlled heating systems. Regardless, an ideal environmental characteristic parameter, such as pressure, is inputted into the controller and the controller monitors at least one sensor, such as a transducer, for a specific sensor reading, making needed adjustments to the speed of the variable speed air intake or outtake fans to maintain a constant parameter at the inputted level.

Each appliance is individually interfaced with the controller such that each appliance is individually monitored and controlled. Power for the appliances is routed through the one controller so that power up calls by the appliances are first intercepted by the controller, with approval from the controller required before any system appliance can be fired up. This power control over the appliances is continuous and permits the controller to shut down the appliances at any time, individually, or as a group.

The controller includes a microcontroller microchip which is the centralized sequential logic processor for the controller and the system. The microcontroller monitors and devices attached to the controller. Control codes and algorithms in the microcontroller make this possible. In addition, the microcontroller of the present invention includes adaptive technology.

The microcontroller electronically stores historical data pertaining to each of the input and output devices, and specifically, historical data relating to the operation of the interfaced appliances. With this stored historical data, the microcontroller is able to make individualized and increasingly informed decisions regarding the operation of the devices. Namely, adjustments to the system based on the demand and system-wide influence of the appliances can be analyzed based strictly on relevant appliances, with the solution specifically directed to those relevant appliances. For instance, if the appliance that last powered up is keeping the system from maintaining a constant pressure level, just that appliance can be shut down to bring the system within acceptable operational levels. In addition, historical data can improve system efficiency. By storing data depicting timing and system procedures, the microcontroller creates a reference database should future system demands require the same procedures. For example, if a specific output to the fan is needed to get the system under pressure control when a particular boiler powers up while two other boilers are powered up, the microcontroller can store that data to memory so that the next time such a procedural configuration arises, the fan can be immediately adjusted to the appropriate speed. Systematic and time-consuming measurements and adjustments can be significantly decreased by referencing and utilizing this historical data.

DETAILED DESCRIPTION OF THE DRAWINGS

Figure 1:
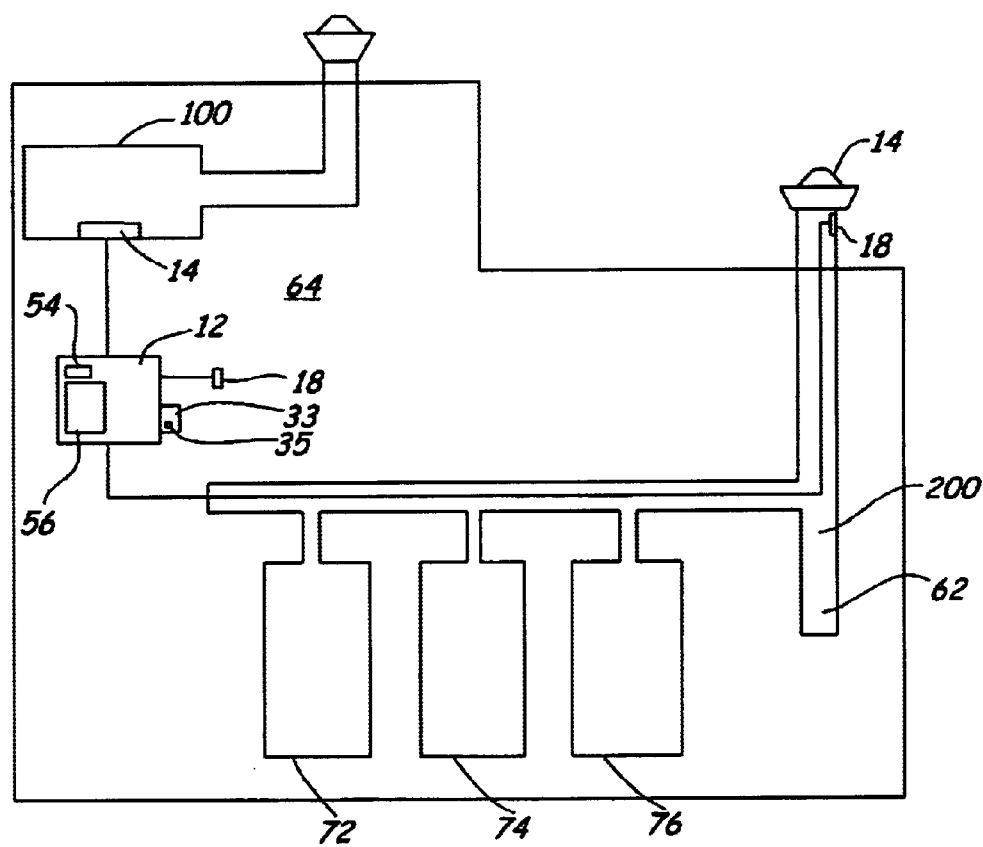
FIG. 1 shows the major aspects of the air control system in accordance with the present invention.

Referring to FIG. 1, a preferred embodiment of the air control system 10 of the present invention is shown. The air control system 10 generally includes an electronic controller 12, at least one variable speed fan 14, at least one enclosed environment 16, and at least one sensor 18.

The air control system 10 is primarily housed within the confines of a building or enclosed structure. However, specific system components can be housed elsewhere, such as outside of the building on a roof or on the exterior surface of a wall.

Figure 2:
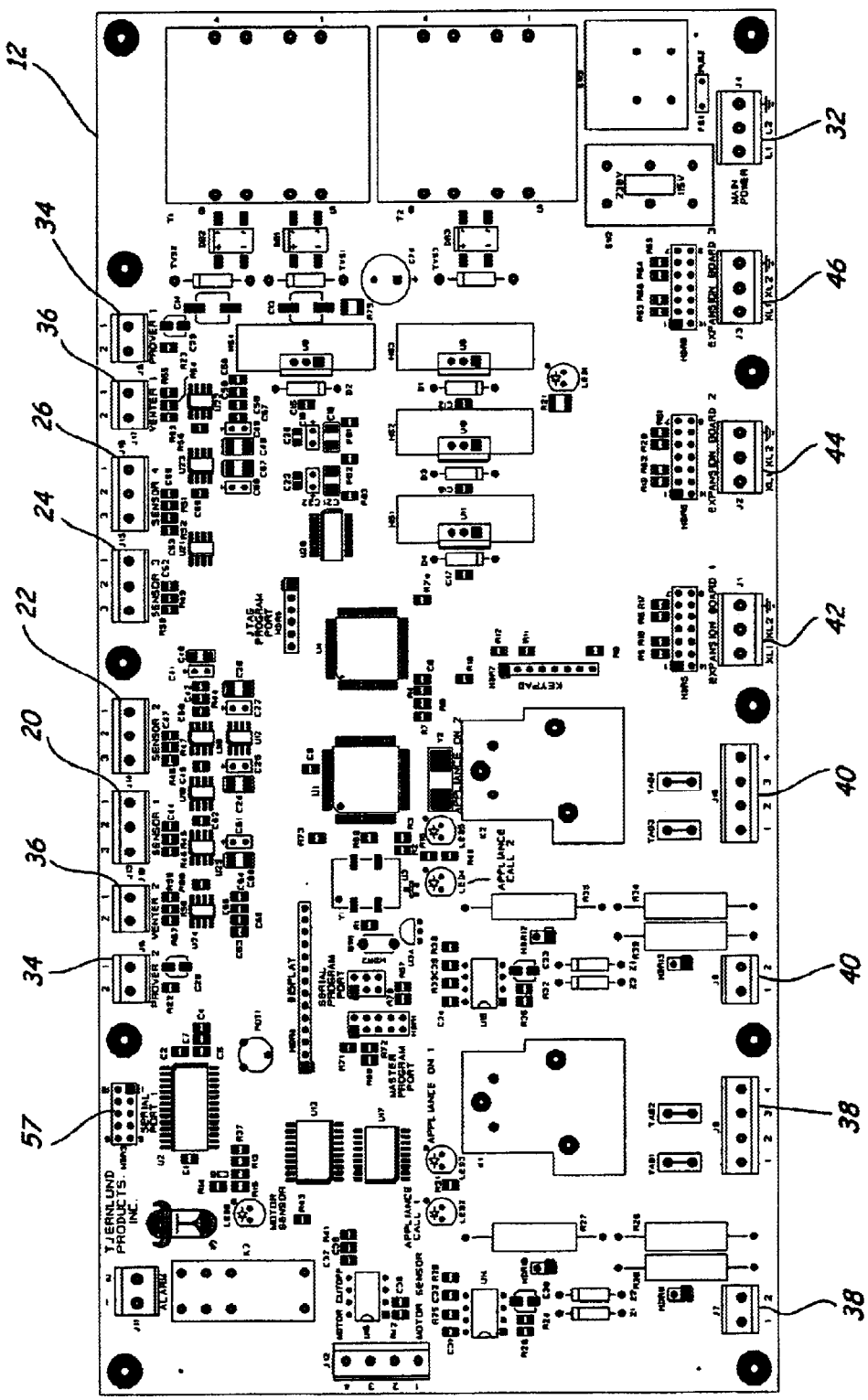
FIG. 2 shows a circuit diagram of the controller of a preferred embodiment of the present invention.

The controller 12 of a preferred embodiment of the present invention is detailed in FIG. 2. The controller 12 ordinarily comprises the following input and output (I/O) devices: sensor inputs 20, 22, 24, 26, a power supply interface 32, prover circuitry 34, fan control circuitry 36, appliance interfaces 38, 40, appliance expansion board interfaces 42, 44, 46, display circuitry 48, keypad circuitry 50, a display 54, a keypad 56, and a serial interface 57. Additionally, the controller 12 comprises a microcontroller 28, and a parallel device controller 30. A memory 52 is preferably contained within microcontroller 28 and handles all of the electronic data storage for the controller 12.

The above listed components and circuitry of the controller 12 are contained on a circuit board with each I/O device being in electronic communication with the microcontroller 28 and the parallel device controller 30, with the parallel device controller 30 generally providing intermediate communication between each I/O device and the microcontroller 28.

Figure 4:
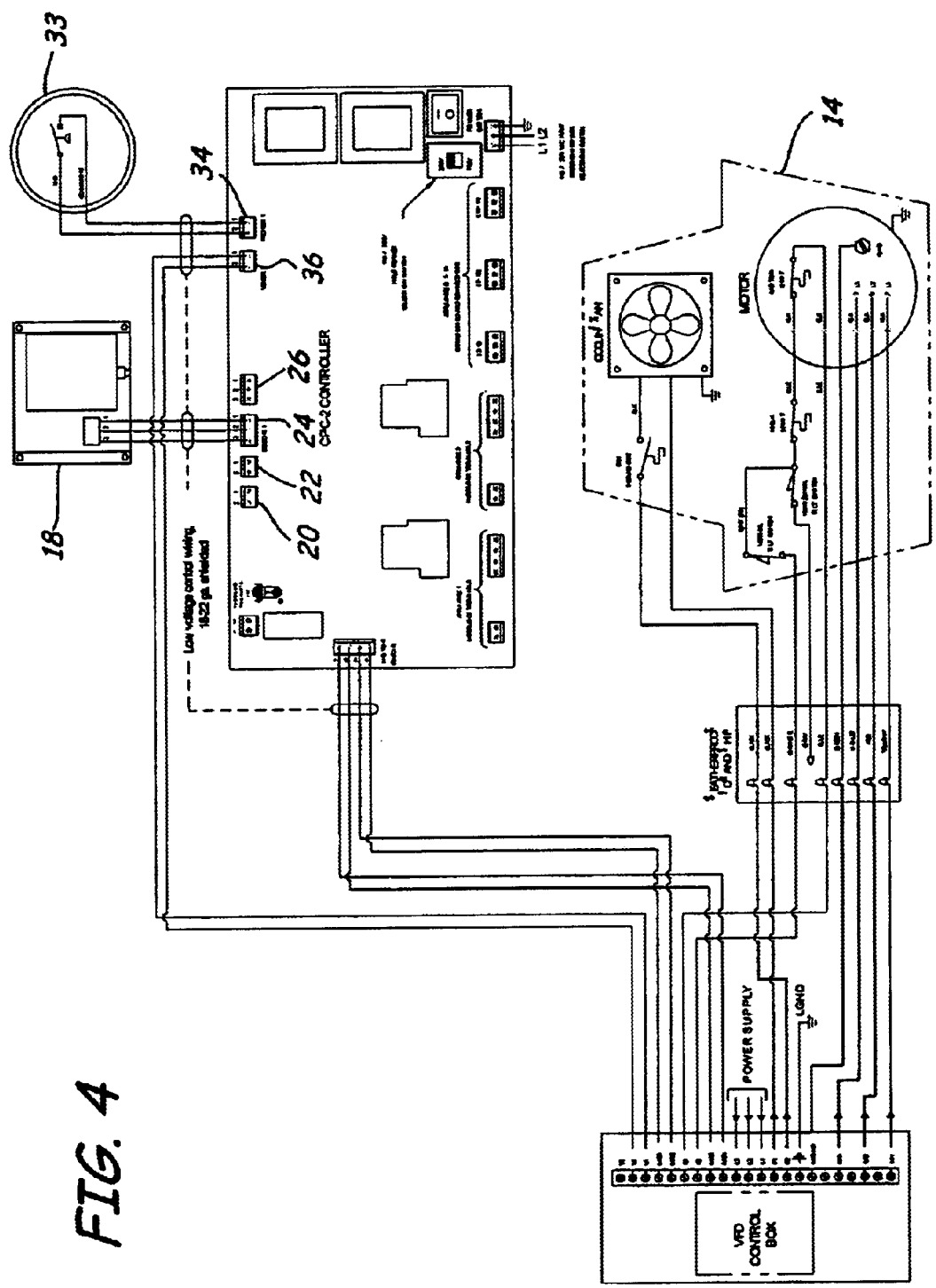
FIG. 4 shows a wiring and circuit diagram of communication between a venting fan and the controller of a preferred embodiment of the present invention.

Referring to FIGS. 1 and 4, the power supply interface generally accepts a switchable 120/230 VAC 50/60 Hz fused power supply for powering the controller 12. The fan 14 generally comprises a variable speed drive 60 which is a variable speed motor capable of receiving varying signals for adjusting the speed at which the motor runs, and consequently turns the fan. The variable speed motor described in U.S. patent application Ser. No. 09/774,277 is hereby incorporated by reference as an example of a motor which can be used to drive the fan 14. The fan control circuitry 36 of the controller 12 controls this signal to the fan 14 motor.

The enclosed environment 16 of a preferred embodiment of the present invention is the area for which the air control system 10 maintains specific characteristics such as pressure, heat, airborne particulates, and the like. For instance, the vent ducts 62 connected within a building for exhausting gases, heat, or for simply transferring controlled air from one area to another, is an enclosed environment 16. In addition, the building itself, and any individual room 64 or section within a building could be the enclosed environment 16 for purposes of the air control system 10 of the present invention.

The sensor 18 of a preferred embodiment of the present invention is a transducer pressure sensor 18. However, any variable sensor could be substituted without deviating from the scope of the invention. Namely, a heat sensor 18 and a particulate sensor 18 are examples of sensors envisioned as being compatible with the air control system 10.

Appliances 72, 74, 76 are interfaced and connected to the controller 12 via the appliance interfaces 38, 40, and additional appliances are interfaceable via further connections supplied by the expansion board interfaces 42, 44, 46. As a result, it should be understood that the use of a finite number of appliances is only for the purpose of illustration and explanation and is not to be interpreted as limiting the number of appliances interfaceable with the controller 12. For example, a preferred embodiment of the controller 12, as seen in FIG. 2, shows two appliance interfaces 38, 40 on the controller 12 circuit board, and expansion board interfaces 42, 44, 46 for interfacing numerous additional appliances. For explanation purposes, discussions of appliances will generally be directed to fuel burning appliances such as boilers, water heaters, and furnaces. However, it is envisioned that other appliances, including non-fuel-burning appliances will be just as interfaceable with the controller 12.

Figure 7:
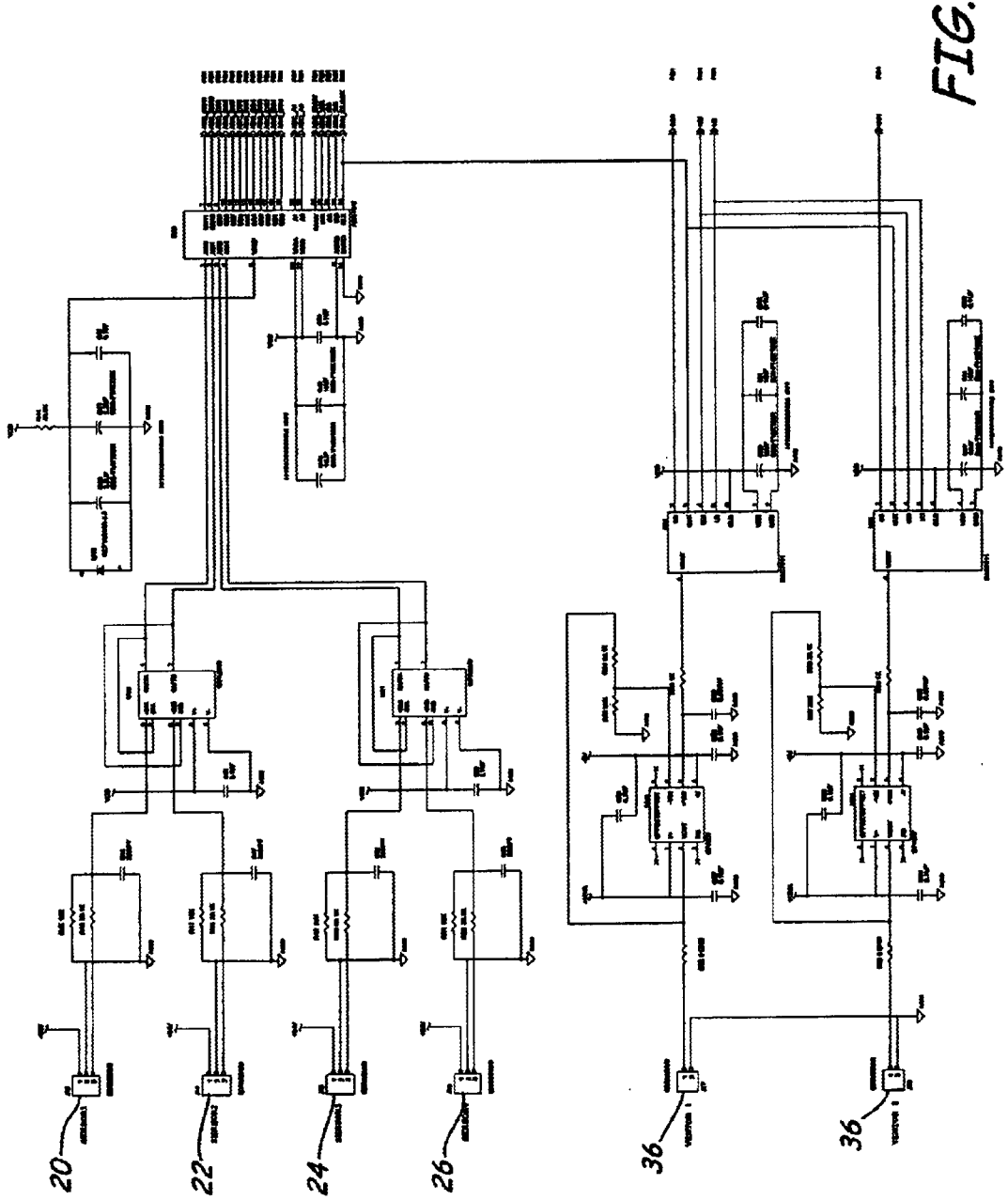
FIG. 7 shows a wiring diagram of sensor connections to analog-to-digital and digital-to-analog converters for a preferred embodiment of the present invention.

The at least one sensor 18 is in electronic communication with controller 12 with the sensor 18 being placed somewhere in the enclosed environment 16, such as in the vent duct 62 for venting configurations, and within the room 64 for combustion intake configurations. For communication between the sensors and the controller 12, analog-to-digital and digital-to-analog converters are used, as shown in FIG. 7. Analog-to-digital converters are used to convert the analog sensor 18 signals for use by the controller 12. Digital-to-analog converters are used to convert the controller 12 communications for use by the variable speed fan 14.

The fan 14 is also in electronic communication with the controller 12, with the fan 14 location within the enclosed environment 16 depending upon the particular focus or configuration of the system 10. For instance, in a venting air control system 100 for venting exhaust from a vent duct 62, the fan 14 is preferably located at the end of the duct 62, which feeds outside the system 100. For comparison purposes, in a combustion air control system 200 for bringing ambient air into the system 200, the fan 14 can be located somewhere in the room 64 with communication with the exterior.

The display 54 and the keypad 56 are in electronic communication with the controller's 12 display circuitry 48 and keypad circuitry 50, respectively.

In operation, the air control system 10 controls environmental characteristics within at least one enclosed environment 16 primarily by using a controller 12 and a variable speed fan motor 14, adjusting the characteristics so that an environmental characteristic parameter is continuously monitored and maintained.

Figure 3:
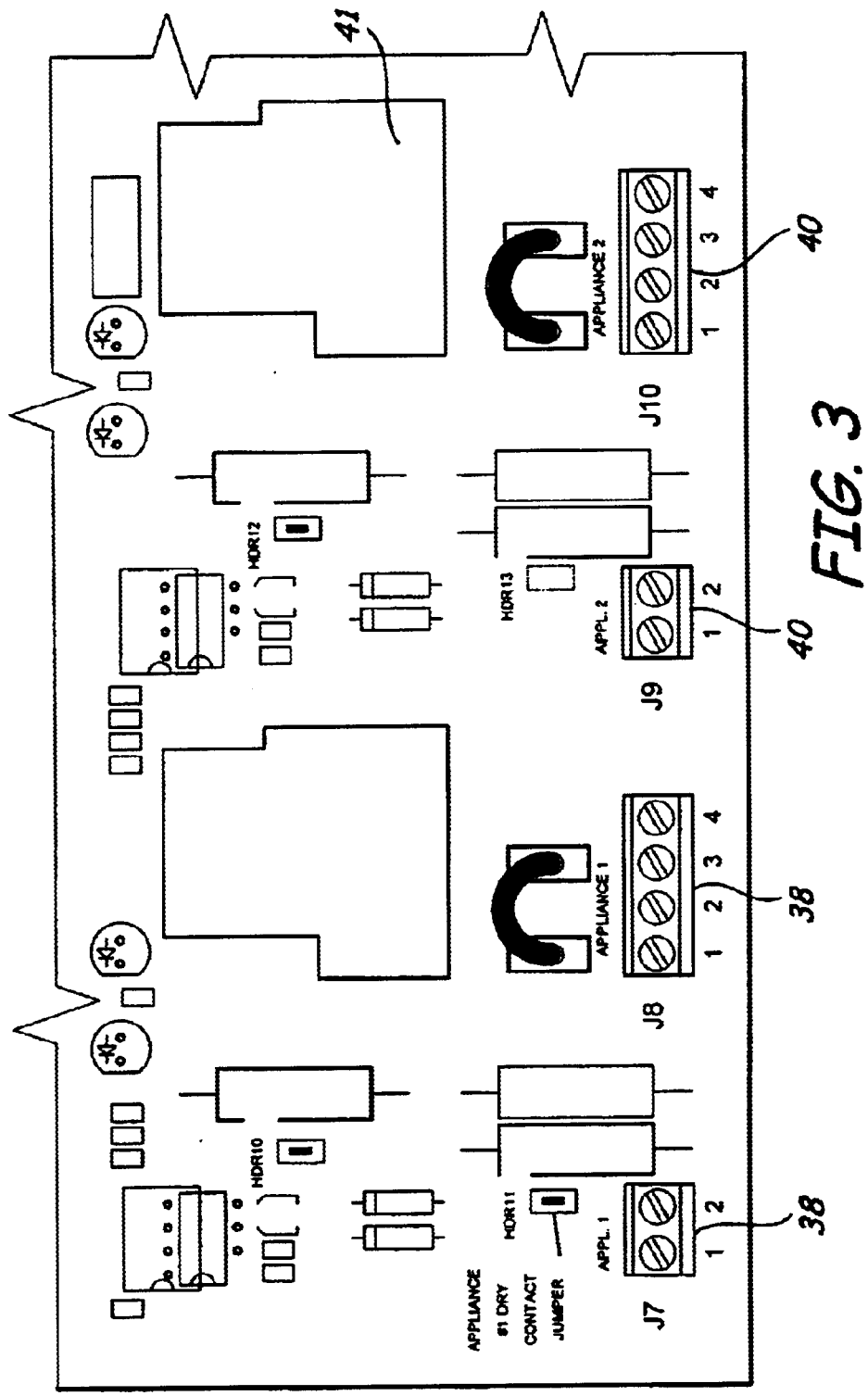
FIG. 3 shows a circuit diagram of the appliance interface circuitry in a preferred embodiment of the present invention.

In a preferred embodiment, as seen in FIGS. 2 and 3, the continuous monitoring and maintenance of the parameter setting is controlled by the controller 12, with the controller 12 obtaining sensing input from at least one sensor 18 at one of the sensor inputs 20, 22, 24, 26 on the controller 12. For the purpose of describing a preferred embodiment, pressure will be the designated environmental parameter, and the parameter will be sensed by a transducer pressure sensor 18, with the variable data from the transducer 18 being fed into the controller 12 through sensor input 20. Multiple sensors 18 can be controlled by the controller 12 through one of the multiple sensor inputs 20, 22, 24, 26.

The keypad 56 of the controller 12 is designed to take input for setting the desired parameter characteristic (i.e., temperature, pressure, or particulate density) and a numeric parameter setting (i.e., a −0.10 in WC pressure setting) which the system 10 will achieve and continuously maintain. In addition, the controller 12 can be configured to receive inputted data at the keypad 56 relating to safety shut-offs, setup settings, and other similar inputs. Located proximate the keypad 56 is the display 54 which in a preferred embodiment is a two-line display visually outputting the inputted pressure parameter along with the actual real-time pressure reading from the transducer 18. The display 54 and keypad 56 are controlled by the FPGA 30, which is in turn controlled by the microcontroller 28.

Still referring to FIGS. 2 and 3, a preferred embodiment of the controller 12 depicts a unit capable of controlling at least two different, and possibly autonomous enclosed environments 16. Rather than using an individual controller for each environment, as is the conventional practice, this controller 12 shares common circuitry to read and process incoming sensor 18 data, and to provide the output signal to the appropriate fan 58 for controlling the variable speed drive 60 of the fan 60, for maintaining a constant pressure within the environment 16. For example, one sensor 18 may feed data back from a combustion intake system 100, while another may receive feedback from a venting system 200. The parameter settings, such as pressure, are inputted at one controller 12, with the one controller 12 controlling the pressure in each environment 100, 200.

The readings from sensor 18 are fed back to the controller 12 through a sensor input 20. Generally, this data is communicated to the FPGA 30 at the rate of approximately 50,000 times a second with the microcontroller 28 preferably only samples at a rate which is a fraction of that, such as 10 times a second. This rate can be adjusted according to the needs of the particular system by having the microcontroller 28 increase the sampling rate. This selective monitoring is indicative of all interactions between the microcontroller 28 and the I/O devices. In conventional controllers, the microcontroller is equipped with an operating system such as a Real Time Operating System (RTOS) in addition to the processing and sampling control code. RTOS provides control over the I/O devices. I/O signals are queued up within the microcontroller 28 for processing. However, this additional processing task, within small and relatively inexpensive microcontrollers, reduces sampling accuracy and reduces the ability of the microcontroller to use processing resources to process increasingly complex sampling algorithms and procedures.

Figure 5:
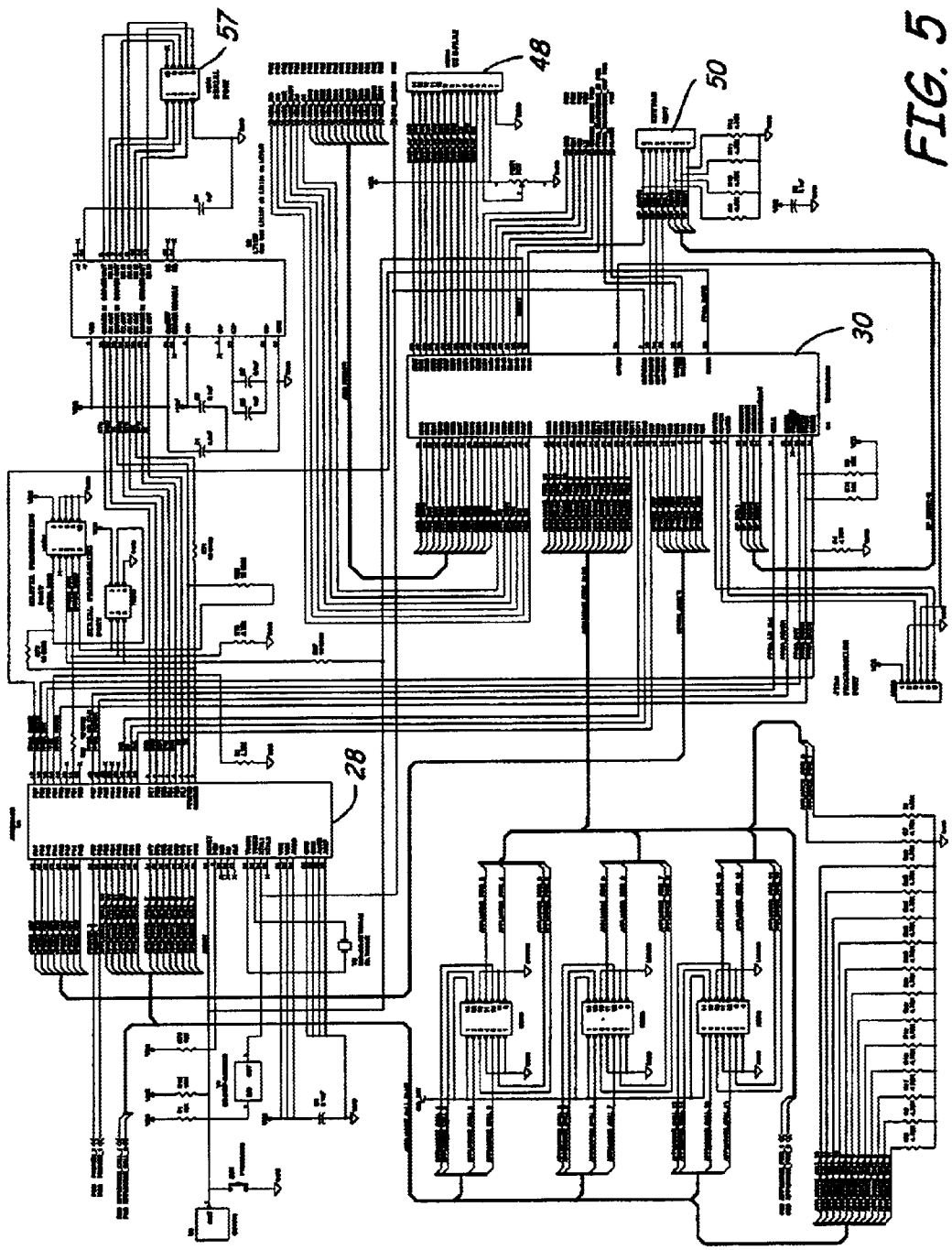
FIG. 5 shows a wiring diagram for the parallel control device, microcontroller, and serial interface of a preferred embodiment of the present invention.

A preferred controller 12 of the present invention uses the parallel device controller 30, such as a field programmable gate array (FPGA), so that a microcontroller operating system is not required within the microcontroller 28 to control and organize the I/O devices. Instead, all I/O communication goes through the FPGA 30, with the microcontroller selectively receiving input data from the FPGA 30 for processing, and sending output data to the FPGA 30 for routing to connected devices, as shown in FIG. 5. It is then easier to incorporate true sample data control strategies imbedded within the microcontroller 28 without the restriction imposed by RTOS. However, It is envisioned that alternative embodiments of the present invention could utilize a microcontroller using an operating system rather than a parallel device controller.

Figure 6:
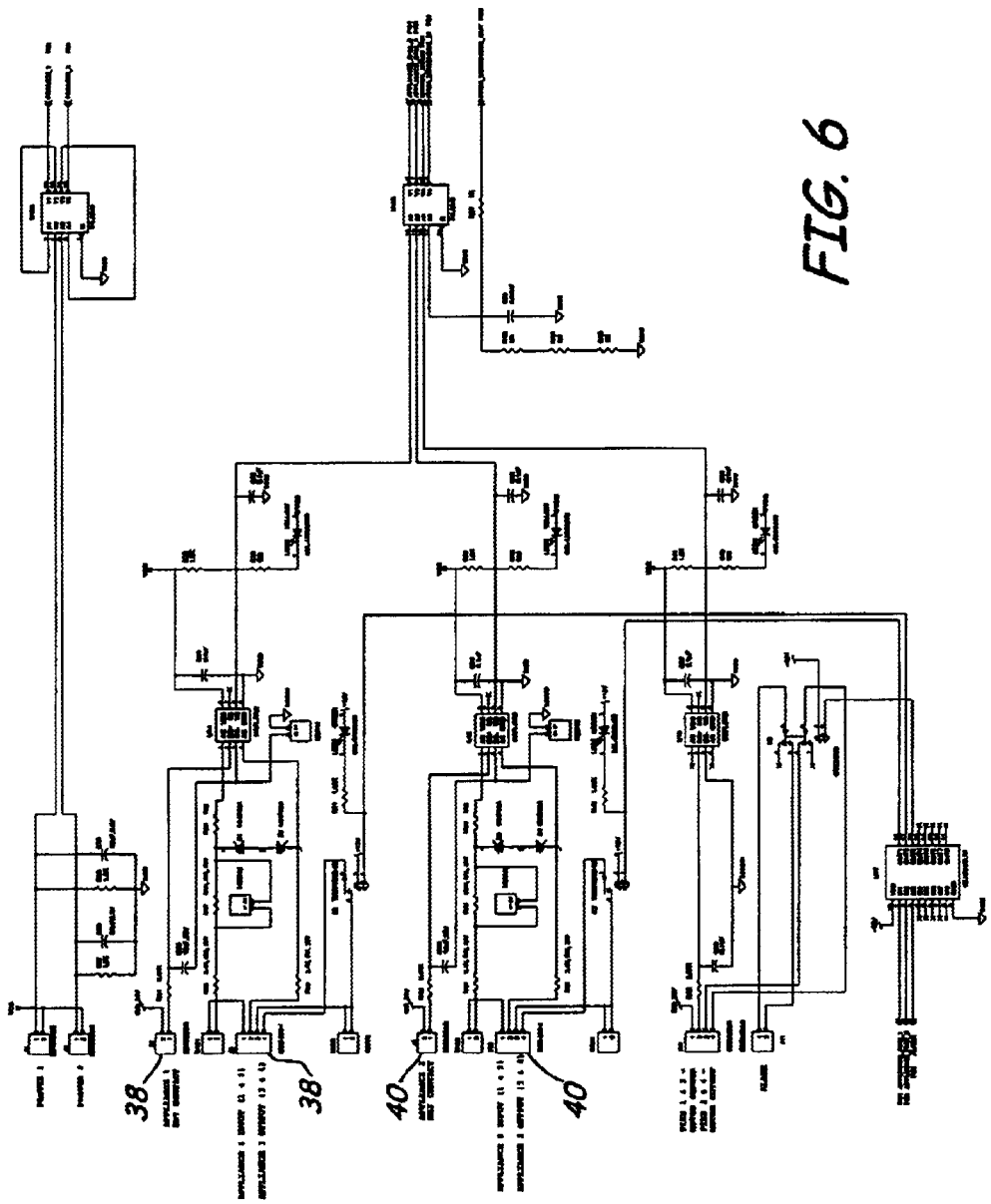
FIG. 6 shows a wiring diagram of the appliance interface of a preferred embodiment of the present invention.

Referring to FIG. 3 and FIG. 6, the circuitry central to interfacing the appliances to the controller 12 is shown. Appliance interfaces 38, 40 receive appliances through a wired electronic connection such that there are, generally speaking, two lines of communication between the controller 12 and the appliance, an input line from the internal activation controls of the appliance to the controller 12 and an output line from the controller 12 back to the appliance. Appliances with control circuitry in the voltage range of 18 to 240 VAC are generally preferred in a preferred embodiment. A boiler appliance 72 will be used as an example to describe the interaction between an appliance and the controller 12 at appliance interface 38. Controls lines coming from the appliance 72 are fed directly into the controller 12, with the appliance 72 needing a closed circuit through the appliance interface 38 in order to activate the boiler appliance 72 for any requested operational requests at the appliance 72. This closed circuit is preferably provided by the switching of a relay switch 41. Identical interfaces are available for each appliance connected to the controller 12.

When the appliance 38 needs to start up, the appliance 38 will initiate its start up procedures. This start up request will be intercepted by the controller 12 through the appliance interface 38, and will be processed by the microcontroller 28. Selected data relating to the appliance power up requests can be stored in memory 52 for later use by the microcontroller 28.

If the microcontroller 28 determines that power up of the appliance 72 is allowable, the circuit will be closed, thus triggering the relay switch 41, and start up will be granted for the appliance 72 to begin operation. The microcontroller 28 can place restrictions on start up. For example, start up may only be granted when readings from sensor 18 are within a specific range, after a specific time, within a specific time interval, if other appliances are not currently up on the system 10, or based on a myriad of other computations and processing algorithms within the microcontroller 28.

The controller 12 interface with each appliance is continuous. Furthermore, at any point, the controller 12 can deny activation to the interfaced appliance. Specifically, this becomes important in dealing with system-wide difficulties in maintaining a specific environmental parameter, such as pressure. If the controller 12 is unable to maintain a requisite parameter setting, such as pressure, power adjustments are first made to the fan 14 in an attempt to bring the deviating pressure within the enclosed environment 16 under control. If the microcontroller 28 determines that if after a specific time count, such as 10 seconds, the variable adjustments to the fan 14 have failed to rectify the problem (the inputted pressure parameter is not met), an adjustment on the demands of the system 10 will be addressed before performing a general shut down of all the interfaced appliances. For instance, using the previous boiler analysis, the microcontroller 28 will review the stored time data for power ups in memory 52. The last appliance to start up will be pulled from this data and the appliance interface 38 circuitry within the appliance 72 will be opened so that the appliance 72 is shut down. Using control code and algorithms imbedded within the microcontroller 28, similar decisions can be made by the microcontroller 28 due to the individual information being stored for each appliance and the ability of the microcontroller 28 to selectively control each individual appliance interfaced with the controller 12 through the appliance interfaces 38, 40 and any expansion board interfaces 42, 44, 46.

In addition to the storage of appliance interface data, the microcontroller 28 can also direct other data to be stored within memory 52. Data from I/O device signals being directed to the microcontroller 28 can be selectively stored to memory 52 in conjunction with corresponding timing information from an internal clock. For example, the microcontroller 28 can retrieve from memory 52 the exact speed the fan 14 was at when a specific pressure reading was reached and maintained, the pressure reading the last twenty times a specific interfaced appliance powered up, and the time required over the last two hundred appliance power ups for a fan 14 to get the pressure in the system up to the inputted level. The microcontroller 28 can rely on the stored data in making system control decisions. For instance, if the controller 12 receives a pressure reading indicating that the pressure in the enclosed environment 16 is beyond the set level, an adjustment will be made to the fan 14 speed. Historical data in memory 52 can assist the microcontroller 28 in more efficiently reaching the requisite pressure. If data has been stored in memory 52 indicating, for example, the average output signal required to get the fan 14 up to speed to obtain a specific pressure level when specific powered up appliances are effecting the pressure within the system, and those same factors are currently at play, the controller 12 can immediately send the appropriate output signal to the fan 14. This gives the controller 12 the flexibility to avoid the sequential process of receiving a sensor reading from the sensor 18, making a speed adjustment to the fan 14, taking another reading, and continuing this process until the desired sensor reading has been obtained. Instead, the controller 12 can send a signal to the fan 14 which immediately takes the fan 14 to a speed that has historically solved the pressure problem in the past. After that, pressure readings from sensor 18 and processing at the microcontroller 28 will determine whether additional adjustments to the speed of the fan 14 must be made. Again, while pressure was used as the example here, the specific sensor and environmental characteristic can vary greatly, as already described.

The stored historical data can be used by the microcontroller 28 to make internal control decisions for operating all I/O devices of the controller 12, and the data can be used in communications with external electronic systems, such as a building management computer control system, interfaced with the controller 12 via the serial interface 57. The data stored in memory 52 can be selectively provided to serial interface 57, and instructions and/or data can be downloaded from the external electronic system to be selectively stored and processed by the microcontroller 28.

In a preferred embodiment of the present invention a prover switch 33 is operably connected to the controller 12 and is in fluid communication with the enclosed environment 16. The prover switch 33 is a mechanical safety backup for shutting down all appliances when the controller 12 is incapable of keeping the system 10 within a predetermined acceptable parameter level after a specified period of time. The prover switch 33 preferably has a predetermined set pressure point generally equivalent to the operating level of the transducer 18. If, for instance, the transducer 18 malfunctions and is incapable of providing accurate readings, and as a result, the controller is unaware of deviating pressure readings within the enclosed environment 16, the prover switch 33 will shut down the appliances until corrections are made. The prover switch 33 is operably connected to the controller 12 through the prover circuitry 34, allowing for shut down control of the interfaced appliances.

The prover switch 33 operates using a prover orifice 35 that shares the fluid communication between the prover switch 33 and the enclosed environment 16. The orifice 35 retards the pressure to the prover switch 33, providing a slow pressure release effect through the switch 33, thus establishing a predetermined duration of time, or grace period, for pressure adjustments to take place before shut down procedures will be initiated. This grace period prevents undesirable false shut downs that occur under conventional mechanical backup techniques. If the orifice 35 effect passes and the pressure level is still not acceptable, appliances will be shut down as the prover switch 33 will communicate shut down to the controller 12 through the prover circuitry 34. The amount of time allowable is generally 10 seconds, and is determined by the configuration and size of the orifice 35. This window of allowable adjustment time of 10 seconds is preferable in light of current regulations regarding pressure venting systems.

What is claimed is:

1. An air control system for governing environmental characteristics in an enclosed environment, the system comprising:

an input device for receiving at least one environmental characteristic parameter;

at least one sensor for measuring said at least one environmental parameter;

a controller in communication with said at least one sensor, the controller comprising electronic circuitry capable of controlling the environmental characteristic according to said at least one parameter in said enclosed environment such that the data from said at least one sensor is received and processed, the controller generating at least one output signal for controlling the environmental characteristic in said enclosed environment, wherein said controller further comprises a plurality of communication ports for individually interfacing with and individually controlling a plurality of appliances, wherein the operation of said plurality of appliances effects said environmental characteristic; and at least one variable speed fan motor for receiving said at least one output signal such that the speed of the fan is controllable to effect the environmental characteristic within said enclosed environment.

2. The system of claim 1, wherein said at least one sensor is selectable from sensors included within the following group: pressure, temperature, humidity, particulates, and density.

3. The system of claim 1, wherein said controller comprises a serial interface for communicating with an external electronic management system.

4. The system of claim 1, wherein said controller comprises memory for retaining historical data corresponding to the operating parameters of the interfaced plurality of appliances for use in controlling the variable speed fan motor.

5. The system of claim 1, wherein said system further comprises a mechanical override safety switch where the switch prevents the appliances from operating when the environmental characteristic is at an unacceptable level for a predetermined time period.

6. The system of claim 1, wherein said electronic circuitry includes a parallel device controller and a sequential logic microcontroller for communicating with and controlling devices attached to the controller, with the parallel device controller serving as an intermediary communication point between the microcontroller and the devices.

7. The system of claim 6, wherein the parallel device controller is a field programmable gate array chip.

8. An air control system for governing environmental characteristics in an enclosed environment, the system comprising:

an input device for receiving at least one environmental characteristic parameter;

at least one sensor for measuring said at least one environmental parameter;

a controller in communication with said at least one sensor, the controller comprising electronic circuitry capable of controlling the environmental characteristic according to said at least one parameter such that the data from said at least one sensor is received and processed, the controller generating at least one output signal for controlling the environmental characteristic in said enclosed environment;

a plurality of appliance interfaces on the controller for individually communicating with and controlling the operations of the individual appliances;

adaptive means on the controller for storing and processing data pertaining to the connected devices for use in later communicating to the devices; and at least one variable speed fan motor for receiving said at least one output signal such that the speed of the fan is controllable to effect the environmental characteristic within said enclosed environment.

9. The system of claim 8, wherein the adaptive means stores and processes data pertaining to the plurality of appliances such that decisions and processing by the microcontroller relating to the operation of the plurality of appliances are reduced based on similar or identical past operations stored in memory.

10. An air control system for governing environmental characteristics in an enclosed environment, the system comprising:

inputting means for receiving at least one environmental characteristic parameter;

at least one sensing means for measuring said at least one environmental parameter;

controlling means in communication with said at least one sensing means, the controlling means comprising electronic circuitry capable of controlling the environmental characteristic according to said at least one parameter in said enclosed environment such that the data from said at least one sensing means is received and processed, the controlling means generating at least one output signal for controlling the environmental characteristic in said at least two enclosed environment;

interfacing means on the controlling means for individually communicating with and controlling the operations of individual appliances;

at least one variable speed fan motor for receiving said at least one output signal such that the speed of the fan is controllable to effect the environmental characteristic within said enclosed environment.

11. The system of claim 10, further comprising adaptive means on the controlling means for storing and processing data pertaining to devices connected to the controlling means for use in later communicating to the devices.

12. The system of claim 10, further comprising mechanical safety means operably connected to the controlling means to prevent the appliances from operating when the environmental characteristic is at an unacceptable level for a predetermined time period.

* * * * *

UNITED STATES PATENT AND TRADEMARK OFFICE
CERTIFICATE OF CORRECTION

PATENT NO. : 6,726,111 B2
DATED : April 27, 2004
INVENTOR(S) : Weimer et al.

It is certified that error appears in the above-identified patent and that said Letters Patent is hereby corrected as shown below:

<u>Title page,</u>
Item [57], ABSTRACT,
Line 4, after "individualized" delete "in".

<u>Column 5,</u>
Line 5, after "monitors" delete "and".

<u>Column 8,</u>
Line 8, delete "with" and insert -- which --.
Line 35, delete "It" and insert -- it --.

Signed and Sealed this

Twenty-sixth Day of July, 2005

JON W. DUDAS
*Director of the United States Patent and Trademark Office*